United States Patent [19]
Sato et al.

[11] Patent Number: 5,568,273
[45] Date of Patent: Oct. 22, 1996

[54] IMAGE READING APPARATUS WITH IMAGE MAGNIFICATION AND SCANNING SPEED CHANGED TO CORRECT FOR FOCUS ADJUSTMENT

[75] Inventors: Yuichi Sato, Yokohama; Nobukazu Suzuki, Kawasaki, both of Japan

[73] Assignee: Canon Kabushiki Kaisha, Tokyo, Japan

[21] Appl. No.: 616,936

[22] Filed: Mar. 18, 1996

Related U.S. Application Data

[63] Continuation of Ser. No. 205,414, Mar. 3, 1994, abandoned.

[30] Foreign Application Priority Data

Mar. 5, 1993 [JP] Japan ..................... 5-045076
May 28, 1993 [JP] Japan ..................... 5-148298

[51] Int. Cl.⁶ .................... H04N 1/393; H04N 1/047
[52] U.S. Cl. ................... 358/451; 358/487; 358/494
[58] Field of Search ................. 358/451, 474, 358/475, 486, 494, 496, 497, 528, 487; 250/201.2; 355/243, 55–63; 382/298

[56] References Cited

U.S. PATENT DOCUMENTS

| | | | |
|---|---|---|---|
| 4,751,376 | 6/1988 | Sugiura et al. | 358/497 |
| 4,833,544 | 5/1989 | Sato et al. . | |
| 4,922,087 | 5/1990 | Nakajima et al. | 358/497 |
| 5,173,789 | 12/1992 | Renner et al. | 358/475 |
| 5,276,534 | 1/1994 | Mutze et al. | 358/474 |

*Primary Examiner*—Scott A. Rogers
*Attorney, Agent, or Firm*—Fitzpatrick, Cella, Harper & Scinto

[57] ABSTRACT

An image reading apparatus comprises a light source for illuminating an image of a document sheet, an image pickup element for photo-electrically converting a light from said document sheet image, a display unit for displaying said document sheet image, an input unit for inputting an instruction to extract a desired area of said document sheet image, and an adjusting unit for adjusting a focus of an optical member for directing a light image from said document sheet image to said image pickup element. The adjusting unit adjusts the focus of said optical member when said input unit inputs the extraction instruction, and said display unit thereafter displays said document sheet image.

5 Claims, 10 Drawing Sheets

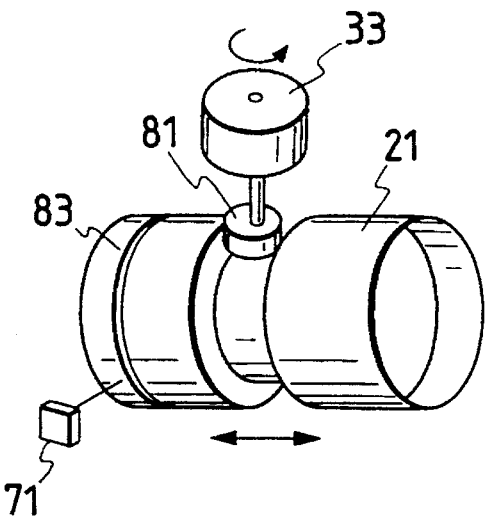
FIG. 8
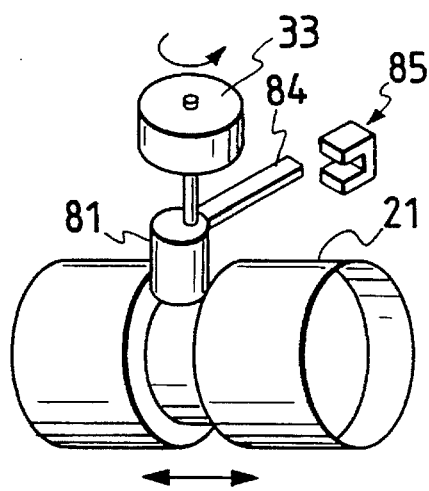
FIG. 9
FIG. 10
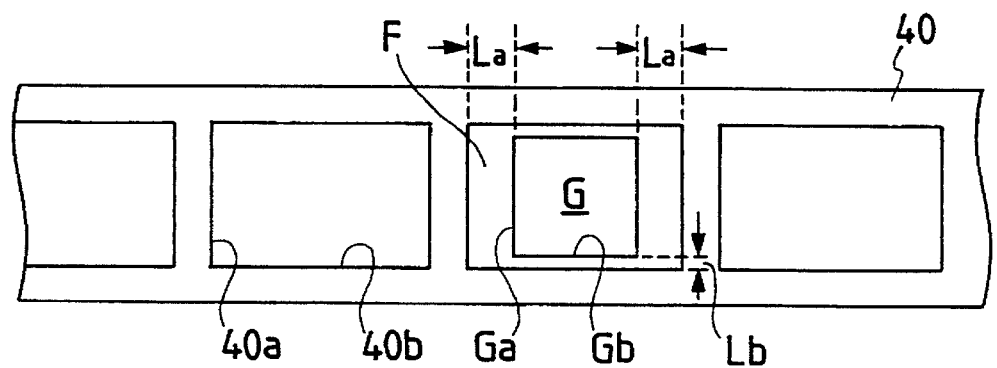

FIG. 11
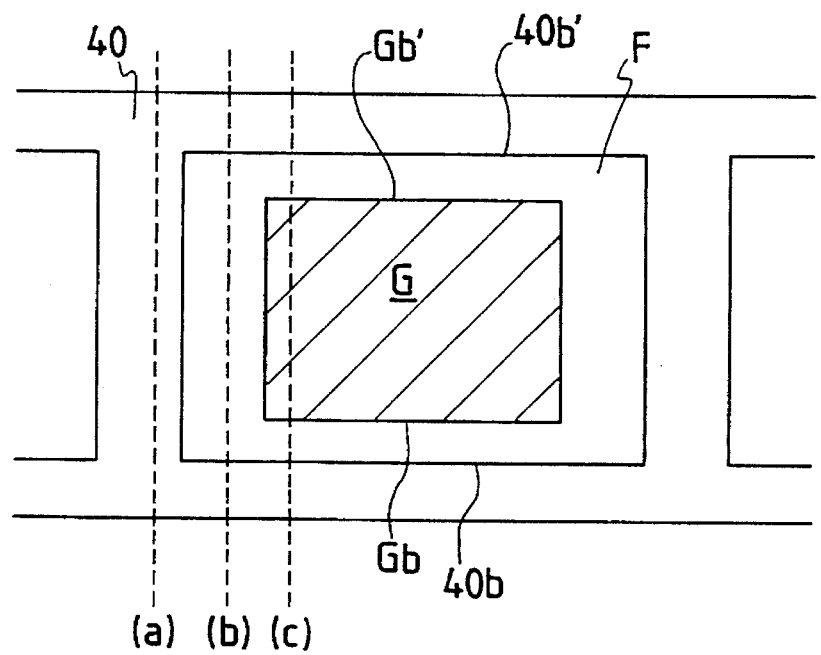
FIG. 12A
FIG. 12B
FIG. 12C
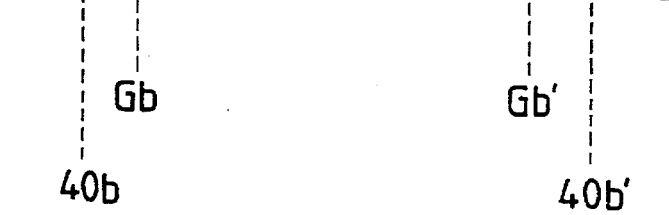

IMAGE READING APPARATUS WITH IMAGE MAGNIFICATION AND SCANNING SPEED CHANGED TO CORRECT FOR FOCUS ADJUSTMENT

This application is a continuation of application Ser. No. 08/205,414 filed Mar. 3, 1994, now abandoned.

BACKGROUND OF THE INVENTION

1. Field of the Invention

The present invention relates to an image reading apparatus which irradiates a light to a light transmissive document sheet such as a film held on a slide mount to read an image.

2. Related Background Art

In the past, a film scanner which has a function of automatic frame feed to automatically feed films sequentially one by one into an illumination unit has been widely known. This apparatus generally comprises a tray for accommodating films which are a light transmissive document sheets held on slide mounts, an illumination unit provided at the bottom of the tray, and a CCD line sensor for reading an image of the film fed into the illumination unit.

The films separately accommodated in the tray are sequentially fed into the illumination unit one by one upon depression of a drive button by an operator and the film is irradiated by a light from a light source such as a halogen lamp provided in the illumination unit. The light image is projected to a read unit so that the image is read by the CCD line sensor.

Each time the drive button is depressed for a short period, the tray is driven by one frame and the film in the accommodation unit corresponding to that frame is fed into the illumination unit. When the drive button is depressed continuously for a long period, the film is automatically and sequentially fed into the illumination unit one by one by an automatic frame feed function so that continuous image read is attained.

A film scanner having an optical viewer has also been widely known. In this apparatus, after a light has been irradiated to a film in the illumination unit, a light image thereof is projected to a screen of the optical viewer so that an operator may search the images of films while he/she watches the projected images.

An automatic focusing mechanism for precisely focusing an image light transmitted through a film onto a CCD line sensor has also been proposed. However, when the focus of the projection lens for focusing the image light from the film onto the CCD line sensor or the optical viewer is adjusted for the automatic focusing, a projection magnification of the image may change before and after the focus adjustment.

If the change of the projection magnification is large, the image cannot be read with a proper magnification and the image may be read with an edge thereof dropped.

It is also proposed to overlay a trimming frame on an optical viewer to indicate trimming. In this apparatus, a light transmissive liquid crystal display panel and a screen are built in the optical viewer and an document sheet image is projected from a rear side to the screen built in the optical viewer. In a trimming mode, the position and the size of the trimming frame displayed on the light transmissive liquid crystal display panel are controlled through console keys to determine a trimming area. When the start of the reading of the image is instructed, the automatic focusing and the automatic exposing are conducted and then the reading of the image is started.

In the prior art apparatus, however, since the automatic focusing is effected after the definition of the trimming area, the projection magnification onto the image pickup elements may change to a different one than that instructed for the trimming area and the trimming area may be shifted before and after the automatic focusing. In order to avoid the change in the magnification, the trimming may be effected after the operator has effected the automatic focusing operation, but this makes the operation complicated.

Further, when the automatic focusing is effected immediately after the mounting of the document sheet, the image may not immediately appear on the display.

SUMMARY OF THE INVENTION

It is an object of the present invention to provide an image reading apparatus for reading an image by using an image pickup element, which eliminates a problem associated with the focusing of an optical member for conducting the image to the image pickup element to allow proper reading of the image.

It is another object of the present invention to allow proper extraction of a desired area in a document sheet image even with the automatic focusing.

It is still another object of the present invention to properly correct a change in a projection magnification due to the automatic focusing to attain the reading of the image without drop of image.

The above objects and advantages of the present invention will be apparent from the following description.

BRIEF DESCRIPTION OF THE DRAWINGS

FIGS. 8 and 9 show configurations for detecting a magnification factor of a projection lens, FIG. 10 shows a film mount, FIG. 11 shows a read position, FIGS. 12A to 12C show read outputs for the read position of FIG. 11.

DETAILED DESCRIPTION OF THE PREFERRED EMBODIMENTS

The preferred embodiments of the present invention are now explained with reference to the accompanying drawings.

First Embodiment

Figure 1:
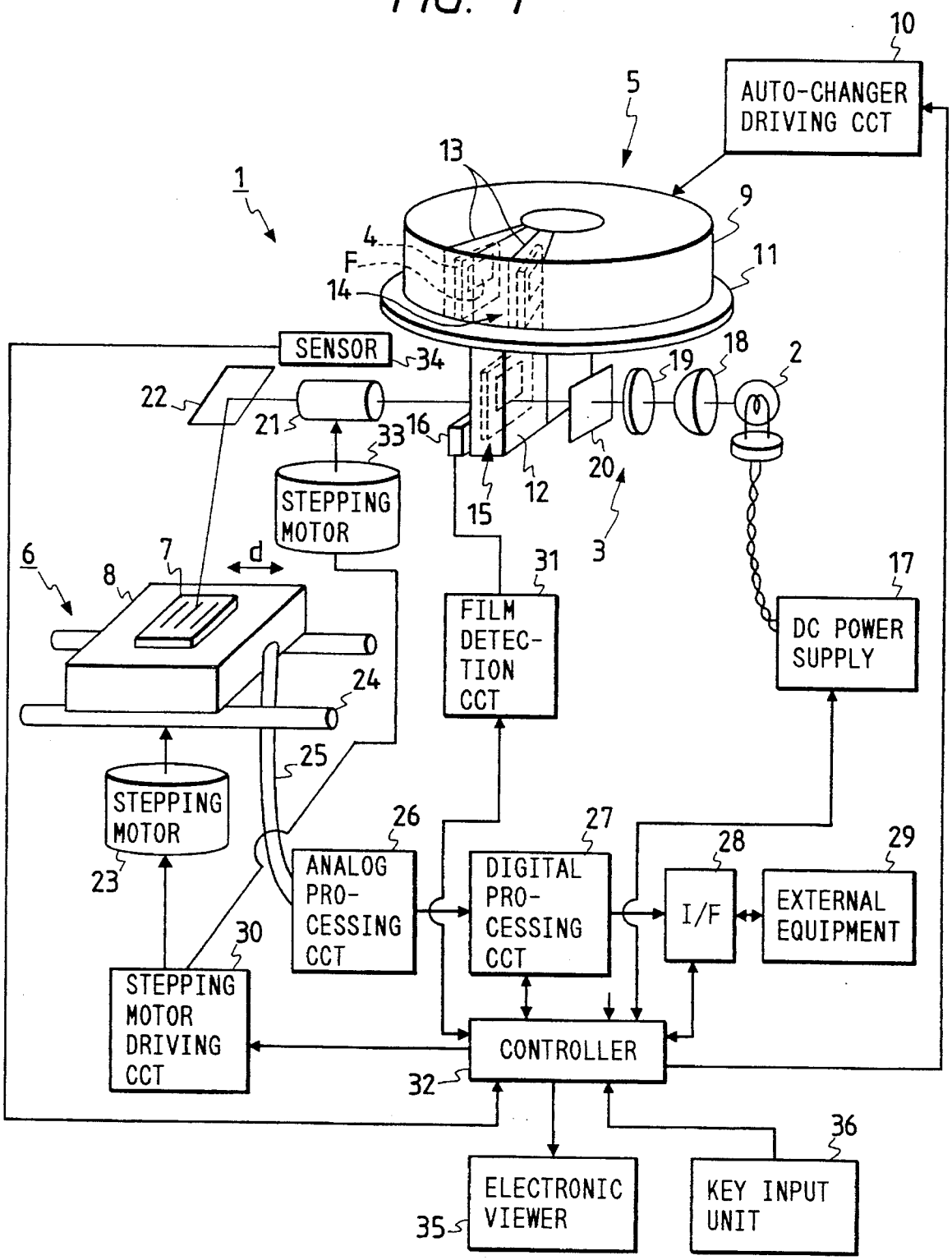
FIG. 1 shows a configuration of an image reading apparatus in accordance with the present invention.

FIG. 1 shows a configuration of an image reading apparatus in accordance with a first embodiment of the present invention. As shown in FIG. 1, the image reading apparatus 1 comprises an illumination unit 3 having a halogen lamp 2 as a light source for irradiating a light to a light transmissive document sheet, an auto-changer 5 for feeding films F which are light transmissive document sheets held on slide mounts 4 and mounted on a film mount frame by frame, into the illumination unit 3 one by one, and a read unit 8 with a line sensor 7 having three CCD sensors as a reader 6 for reading an image of the film F in the illumination unit 3.

The auto-changer 5 is mounted on a tray table 11 such that a tray 9 may be driven by an auto-changer drive circuit 10 and a read unit 12 is arranged under the tray table 11 to be positioned in the illumination unit 3.

A plurality of housings are formed in the tray 9 at a constant interval and radially to a center of rotation and one film F is accommodated in each housing 13. Each time an operator depresses an advance button or a retract button (not shown) provided on a key entry unit 36, the tray 9 is driven by one position forwardly or backwardly. The film F in the housing 13 driven into a supply position 14 is dropped to a read position 15 in the read unit 12 and the image is read at the read position 15 and the film F is again accommodated in the housing 13. A sensor 16 for detecting the presence and absence of the film F at the read position 15 is provided in the vicinity of the read unit 12.

By repeating the above operation, the films F accommodated in the tray 9 are fed to the read position 15 one by one and the images thereof are read. When the advance button or the retract button is continuously depressed, the films F are automatically fed into the read position 15 one by one by the automatic frame feed function so that the images are continuously read.

In the illumination unit 3, a light emitted from a halogen lamp 2 connected to a DC power supply 17 irradiates the read unit 12 through a condenser lens 18, a field lens 19 and an optical filter 20. The film F in the read position 15 is irradiated by the light and a transmitted light therefrom passes through an imaging lens 21 and is reflected by a reflection mirror 22, directed to the 3-line sensor 7, photo-electrically scanned by the 3-line sensor 7 and the image is read thereby.

The 3-line sensor 7 comprises three CCD line sensors having red, green and blue on-chip optical filters arranged thereon. Main scan is conducted by each line sensor, and sub-scan is conducted by driving the read unit 8 along a rail 24 normally (direction d) to the main scan direction by a stepping motor 23, and the image of the film F is read line by line.

The information read by the 3-line sensor 7 is supplied in a form of analog signal to an analog processing circuit 26 through a cable 25 and it is DC restored, amplified and A/D converted, and it is further digitally processed in a digital processing circuit 27, and sent to an external equipment 29 through an interface circuit 28.

In the digital processing circuit 27, trimming for extracting an image in a designated trimming area from the image of the film F in accordance with a trimming instruction to be described later is conducted, and various imaging processes such as image magnification control and edge emphasis are conducted under the control of a controller 32 in accordance with an instruction from the operator through a key entry unit 36.

The image signal processed in the digital processing circuit 27 is supplied to the external equipment 29 such as a printer or a workstation through the interface circuit 28.

Connected to the controller 32 are a stepping motor drive circuit 30 for driving the stepping motors 23 and 33, the interface circuit 28, the digital processing circuit 27, a film detection circuit 31 for processing information from the sensor 16 and an auto-changer drive circuit 10. The controller 32 controls the synchronization of the sub-scan in the 3-line sensor 7 with the external equipment 29, the setting of the digital processing circuit 27 and the drive of the auto-changer 5 based on the information from the sensor 16.

Further connected to the controller 32 is the DC power supply 17 to function as a light intensity control unit for controlling the voltage of the DC power supply 17 so that the illumination light intensity of the halogen lamp 2 is changed in accordance with the presence and absence of the film F in the illumination unit 3 and the read operation in the read unit 6.

The imaging lens 21 is controlled and driven by the stepping motor 33 from the controller 32 through the stepping motor drive circuit 30 to adjust the focus. The focusing is conducted by monitoring the output derived by reading the image of the film F by the 3-line sensor 7, by the controller 32. A sensor 34 is a position sensor such as a photo-interrupter for detecting a reference position of the imaging lens 21. An electronic viewer 35 comprises an image display such as a CRT or an LCD and displays an image of the film F read by pre-scan by the 3-line sensor 7 and a console image under the control of the controller 32. In the trimming process, it displays the trimming area designated by the operator in combination with the film image. The key entry unit 36 is used by the operator to operate the apparatus.

Figure 2:
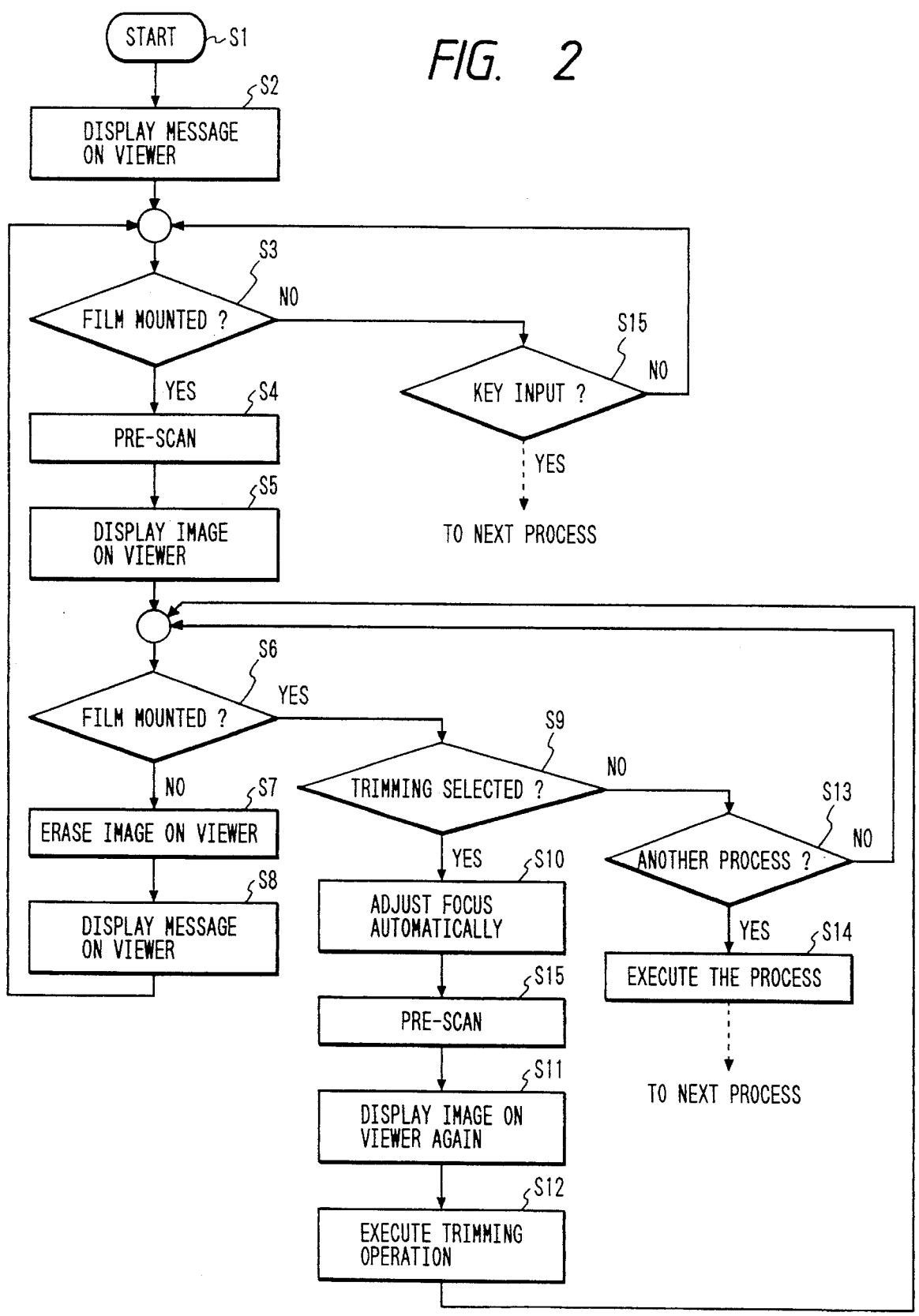
FIG. 2 shows a flow chart of an operation sequence in the apparatus of FIG. 1.
Figure 3:
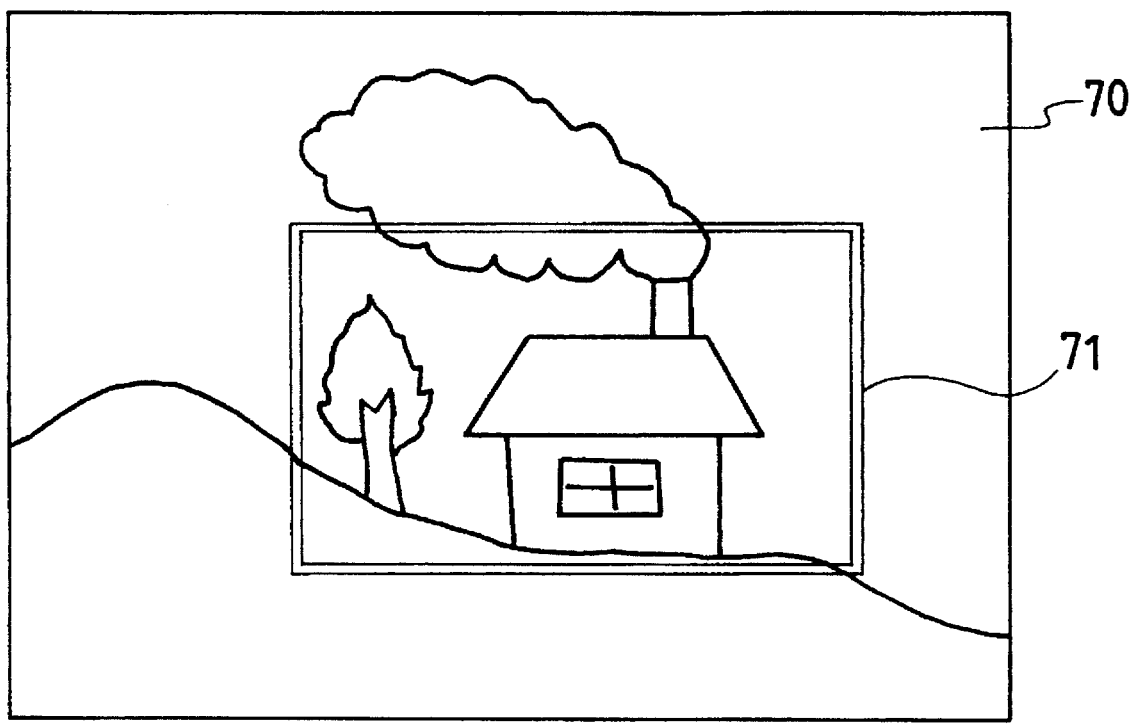
FIG. 3 shows a display of an image.

FIG. 2 shows a flow chart of a sequence control in the controller 32 when the trimming is conducted in the image reading apparatus of the present embodiment. In FIG. 2, when the apparatus is powered on, the respective units are initialized and become ready to operate and the reading of image is ready (step S1), the controller 32 outputs a film mount request message to the electronic viewer 35 (step S2), and the process stands by until a film is mounted in the read position 15 or any console key in the key entry unit 36 is depressed (steps S3, S15). When the mounting of the film is detected by the film detection circuit 31 (YES in the step S3), the document sheet is scanned at a high speed by the pre-scan by using the 3-line sensor 7 to acquire density information and thinned image information (step S4), and the image information derived by the pre-scan is displayed on the electronic viewer 35 (step S5). Thus, the entire image of the film F currently mounted in the read position 15 can be monitored by the electronic viewer 35.

Then, the process stands by until any key is depressed (steps S6, S9, S13). For example, when a trimming key of the key entry unit 36 is depressed (step S9), the automatic focusing is conducted (step S10).

The automatic focusing is briefly explained. When the automatic focusing is to be conducted, the read unit 8 is first driven to allow the reading of a substantially center area of the image of the film F by the 3-line sensor 7. The imaging lens 21 is set to the initial position and the image information outputted from the line sensor having the green filter of the 3-line sensor 7 is supplied to the controller 32 through the analog processing circuit 26 and the digital processing circuit 27. The controller 32 conducts an operation of squaring a difference between adjacent pixels for a predetermined number of pixels of the image information and sums them. This operation is conducted a plurality of times while the focus position of the imaging lens 21 is changed sightly, and the imaging lens 21 is set to the focus position which results in a maximum sum.

After the automatic focusing, the document sheet is again pre-scanned at a high speed to monitor the image of the film in the fixed position of the imaging lens 21 (step S15) and it is again displayed on the electronic viewer 35 and a massage of ready to trimming is simultaneously displayed on the electronic viewer 35 (step S11). The timming is conducted by the operator (step S12) and the process stands by the next key entry (steps S6, S9, S13).

The trimming by.the operator is conducted in the following manner. In the re-display of the image after the automatic focusing, a rectangular frame 71 of a predetermined size is displayed in overlap to the image 70. The rectangular frame 71 is a trimming frame representing an image area to be trimmed and the frame may be set to any desired size by operating an area specifying key on the key entry unit 36.

When the operation key for other process such as the start of read key or the magnification adjust key is depressed (step S13), the other process is conducted (step S14).

On the other hand, when the films are exhausted from the film mount unit (step S6), the image displayed on the electronic viewer 35 is erased and a massage requesting the mount of the next film is displayed, and the process stands by the mounting of the next film (steps S3, S15). When the operation key is depressed (step S15), the process proceeds to the next step.

In accordance with the present embodiment, the automatic focusing is not conducted when the document sheet is loaded, and when the trimming mode is started by the depression of the trimming selection key, the automatic focusing is conducted and the image of the document sheet is again displayed on the viewer and the trimming area is specified. Accordingly, there is no difference between the projection magnifications in the trimming and the actual scan and the problem of deviation of the trimming area from the area intended by the operator is avoided.

Further, since the automatic focusing is automatically conducted by the selection of the trimming, it is not necessary to separately instruct the automatic focusing and the number of times of operation of the operation keys is reduced. Further, the image is displayed without focusing after the mounting of the film and the time required to display for the confirmation of the film frame is reduced.

Second Embodiment

Figure 4:
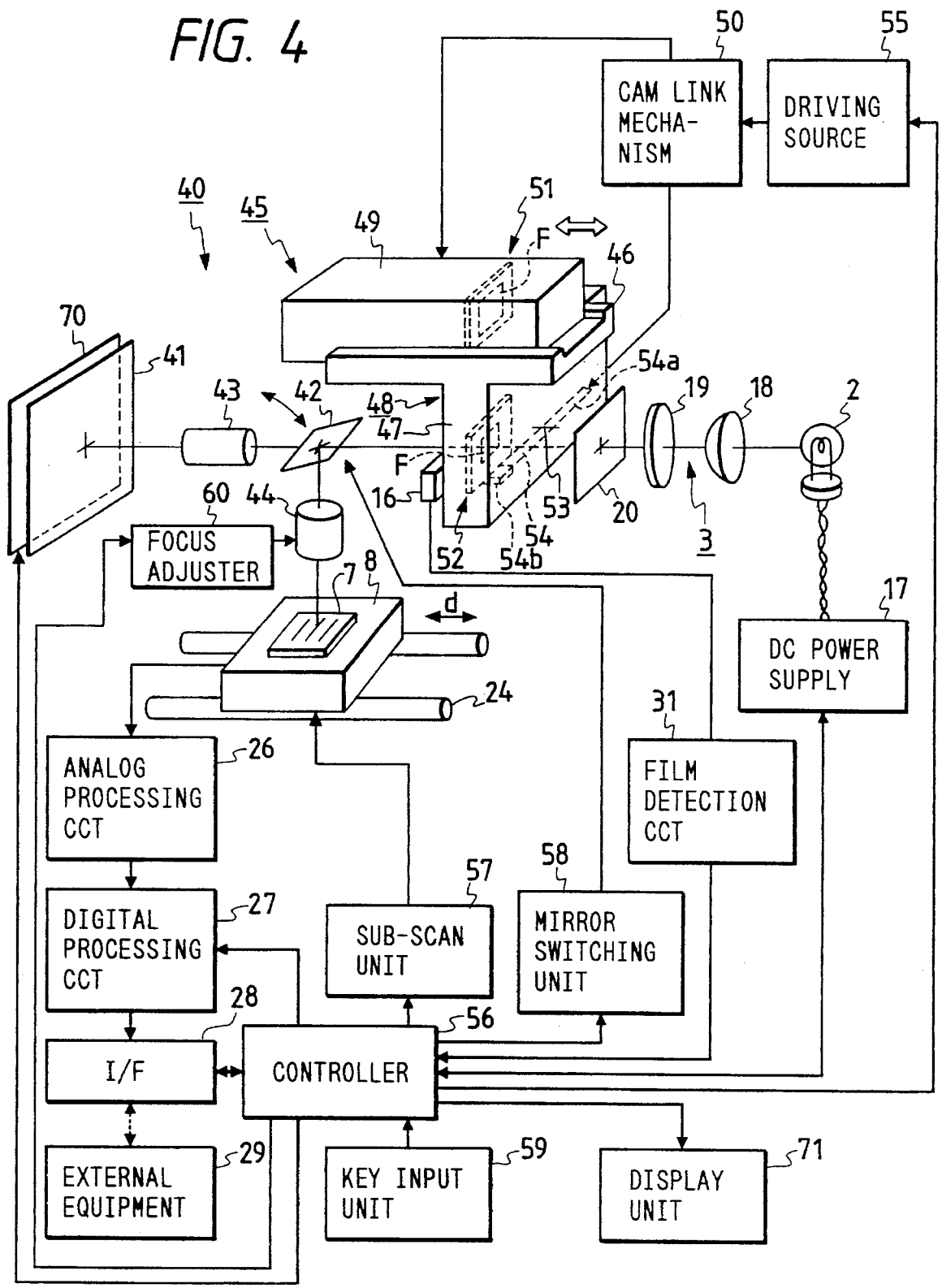
FIG. 4 shows a configuration of a second embodiment of the image reading apparatus.

FIG. 4 shows a schematic configuration of the image reading apparatus in accordance with a second embodiment of the present invention. In FIG. 4, the identical elements to those of the image reading apparatus of the first embodiment are designated by the identical numerals and the explanation thereof is omitted.

The image reading apparatus 40 of the present embodiment comprises a screen 41 which forms an optical viewer as the display unit for displaying a projected image of the film F. When the transmitted light from the film F is reflected by an optical path switching mirror 42 toward a projection lens 43, the light image of the film F is projected to the screen 41 through the projection lens 43.

When the transmitted light from the film F is reflected by the optical path switching mirror 42 toward an imaging lens 44, the light image of the film F is projected to the 3-line sensor 7 through the imaging lens 44 and the image is read in the same manner as that of the first embodiment. The optical path switching mirror 42 switches the optical path by moving in the direction shown by an arrow so that the transmitted light from the film F is directed to one of the imaging lens 44 and the projection lens 43.

An auto-changer 45 comprises an auto-changer main unit 48 including a tray table 46 and a read unit 47, and a parallelpiped-shaped tray 49 arranged on the tray table 46 to allow the parallel movement along the longitudinal direction (an arrow in FIG. 4) of the tray table 46. The tray 49 is driven by a cam link mechanism 50 in a direction of an arrow so that the film F accommodated in the tray 49 is driven to a supply position 51 and dropped to a read position 52 of the read unit 47 positioned in the illumination unit 37.

A lift lever 54 is provided in the read unit 47 to allow the pivotal movement thereof around a shaft 53. When an end 54a of the lift lever 54 is driven upward by the cam link mechanism 50, an end 54b of the lift lever 54 is moved downward. As a result, the film F in the supply position 51 is dropped onto the end 54b in the read position 52. When the end 54a is driven downward, the end 54b is moved upward so that the film F in the read position 52 is lifted up and returned to the supply position 51 in the tray 49.

The cam link mechanism 50 is constructed such that a cam (not shown) for driving the lift lever 54 up and down and a feed mechanism (not shown) for frame-feeding the tray 49 are linked. The cam is rotated by a drive source 55 such as a DC motor 55 and the feed mechanism is driven. An output from a photo-interrupter or a microswitch (not shown) for detecting the position of the cam is supplied to the controller 56 which controls the drive of the cam link mechanism 50 by the drive source 55 in accordance with the output information.

Connected to the controller 56 are a sub-scan unit 57 including a stepping motor, a driver, a control unit and a link mechanism (not shown) for driving the read unit 8 in the sub-scan direction (direction d in FIG. 4), a mirror switching unit 58 including a solenoid for driving the optical path switching mirror 42 and a link mechanism (not shown), a transmissive type liquid crystal display unit 70 for displaying a trimming frame, the key entry unit 59 and the display unit 71. The controller 56 also functions as a light intensity control unit for controlling the voltage of the DC power supply 17 to change the illumination light intensity of the halogen lamp 2 in accordance with the presence or absence of the film F in the illumination unit 3 as the controller 32 in the first embodiment does.

In the apparatus of the present embodiment, like in the first embodiment, the image of the film F is read, and the light image of the film F is projected to the screen 41 by deflecting the optical path switching mirror 42 by the mirror switching unit 58 so that the operator may search the image by frame-feeding the images while he/she watches the projected image on the screen 41.

The focus adjusting unit 60 includes a stepping motor for driving the lens as it does in the first embodiment, and it drives the imaging lens 44 along the optical axis under the control of the controller 56 to focus the image projected to the 3-line sensor 7. The projection lens 43 is linked to the imaging lens 44 to simultaneously change the projection magnification of the image displayed on the optical viewer 41.

In the trimming of the present embodiment, a trimming frame is displayed on the transmissive type liquid crystal display unit 70 arranged to be overlaid on the optical viewer 41 so that the operator may watch it in overlap with the image projected on the optical viewer 41. The trimming frame is controlled by specifying the enlargement, reduction or movement of the frame by the area specifying key in the key entry unit 59.

Figure 5:
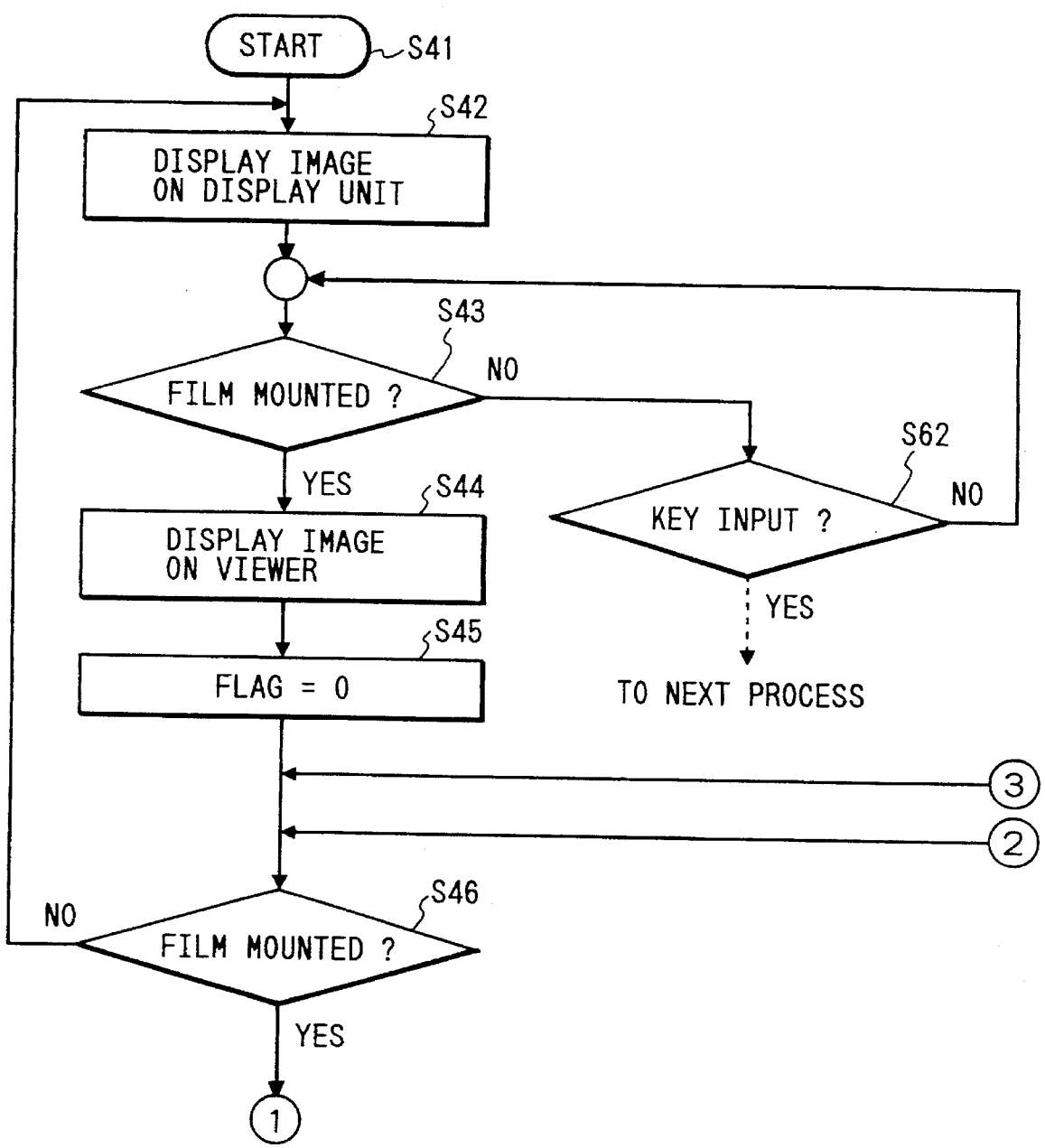
FIGS. 5 and 6 show flow charts of an operation sequence in the apparatus of FIG. 4.
Figure 6:
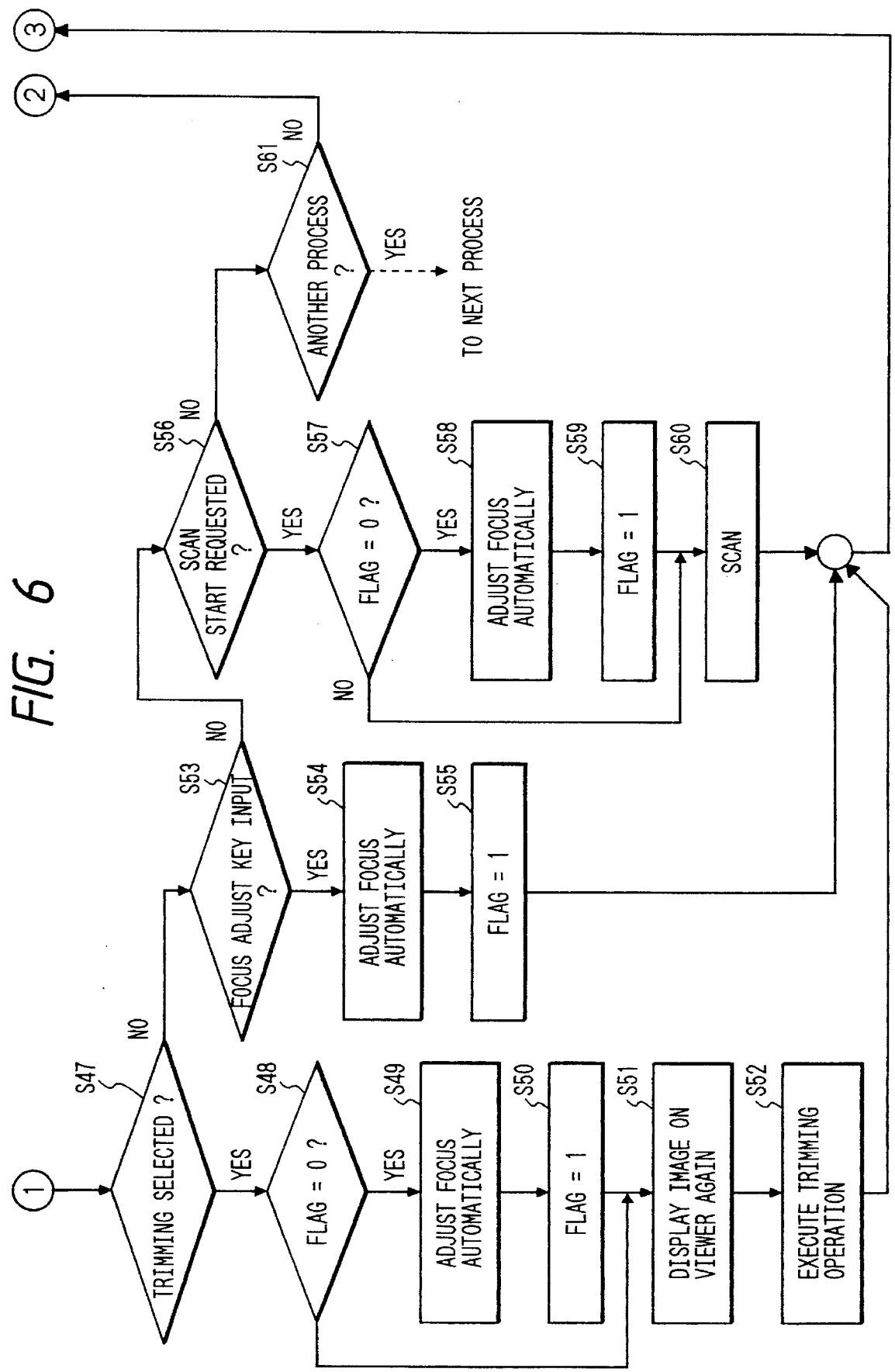

FIGS. 5 and 6 show flow charts of a sequence control in the controller 56 when the trimming is conducted in the image reading apparatus of the present embodiment.

In FIG. 5, when the apparatus is powered on and ready to operate (step S41), the controller 56 outputs an operation request message to the display unit 71 (step S42). When it is determined that no film is mounted (NO in the step S43) and there is no key entry (NO in a step S62), the process stands by. When a key is depressed in the step S62, the process proceeds to the next step in accordance with the key entry.

When the mount of the film is detected in the step S43, the mirror 42 is switched to the position of the projection lens 43 to display the image on the optical viewer 41 (step S44), and a flag indicating the automatic focusing is set to "0" to indicate that the focusing is not conducted (step S45).

When the film is mounted (YES in the step S46), the process stands by until any key of the key entry unit 59 is depressed (a loop of steps S47, S53, S56, S61 of FIG. 6 and the step S46). When the trimming selection key is depressed by the operator to select the trimming (YES in the step S47) and the flag is determined as "0" in a step S48 indicating that the automatic focusing is not conducted, the mirror 42 is switched to the position of the imaging lens 44 to direct the film image to the 3-line sensor 7, and the automatic focusing is conducted in the same manner as that described above (step S49), and the flag is set to "1" (step S50).

Then, the mirror 42 is again switched to the position of the imaging lens 44 to display the image again on the optical viewer 41 (step S51) to recognize the designation of the trimming area by the operator (step S52), and the process stands by the next key entry.

On the other hand, when the flag is determined to be "1" in the step S48, it means that the focusing has been conducted, and no further automatic focusing is conducted and the image is displayed again on the optical viewer 41 (step S51) to recognize the trimming area (step S52).

On the other hand, when the focus adjustment key is depressed (step A53), the automatic focusing is conducted (step S54) in the manner described above, the flag is set to "1" (step S55) and the process stands by the next key entry. When a start of scan request key is depressed (step S56) and the flag is "0" (YES in the step S57), the automatic focusing is conducted (step S58), the flag is set to "1" (step S59) the scan is conducted (step S60) and the process stands by until the next key entry.

On the other hand, when the flag is "1" in the step S57, it indicates that the automatic focusing has been conducted and no further automatic focusing is conducted and the scan is conducted (step S60).

When a key for other process is depressed in the step S61, the next step is conducted.

In accordance with the present embodiment, the focusing is not conducted at the time of mounting of the film, and when the trimming is selected, the focusing is conducted only when the history tells that the focusing has not been conducted. Accordingly, the time required for useless focusing is eliminated and the operability is improved.

Further, since the mechanism for switching the optical path of the transmitted light from the film F is provided to project the light image of the film F on the screen so that the operator can feed the films while he/she watches the projected image, the search of the image is facilitated.

In the first and second embodiments described above, in order to eliminate the affect by the change in the image projection magnification by the automatic focusing, the image is displayed again on the electronic viewer or the optical viewer after the automatic focusing and the specification of the trimming area is recognized under that condition.

Alternatively, the trimming area may be recognized before the automatic focusing and the trimming area may be corrected while taking the subsequent change of the projection magnification by the automatic focusing into consideration.

In the arrangement of the first embodiment which uses the electronic viewer, the automatic focusing may be conducted while the image display before the automatic focusing to the electronic viewer is held and the trimming area designated to the displayed image before the automatic focusing may be corrected while taking the change of the projection magnification by the automatic focusing into consideration.

The automatic focusing may be conducted in the return of the pre-scan for the image display of the electronic viewer so that the waste time is further reduced.

In the above embodiments, the problem of shifting of the trimming area specified by the operator by the automatic focusing resulting in an undesired trimming area is eliminated.

However, the shift by the automatic focusing occurs not only in the trimming area but also in the projection magnification to the 3-line sensor.

When an output image is to be produced from the document sheet, an output range of the actually outputted image may differ from the output range of the image which the operator desired to output.

This is because the position of the imaging lens is moved from a home position by the automatic focusing. For example, when the imaging lens is moved by a distance L, an actual magnification to the CCD is $(A_0+\alpha)$ although the projection magnification has been set to $A_0$, and it somewhat differs from the desired magnification $A_0$.

For example, in the design of the apparatus, while a distance between a reference plane of a document film and the image pickup element is constant, the position of the film plane deviates from the reference plane if the film warps or mounted on the mount. Accordingly, the automatic focusing is conducted to focus it to the film plane but since an optical path length changes, the projection magnification varies.

For example, assuming that a focal distance of the imaging lens is 100 mm and a projection magnification of the image pickup element to the film is 1.32, a magnification error of approximately 1% occurs when the film plane is moved by 0.5 mm along the optical axis. The drive-out amount of the imaging lens is approximately 1.3 mm.

There are various types in conventional slide mounts. They are different in thickness, and when one end of the mount is used as a reference, the position of the film plane includes an error of approximately 1 mm. The film may be warped depending on the storage state of the film, and it may be warped as much as 1 mm.

Accordingly, the correction of the magnification is needed in order to suppress the magnification error within 1%.

A configuration of the magnification correction is now explained.

Third Embodiment

Figure 7:
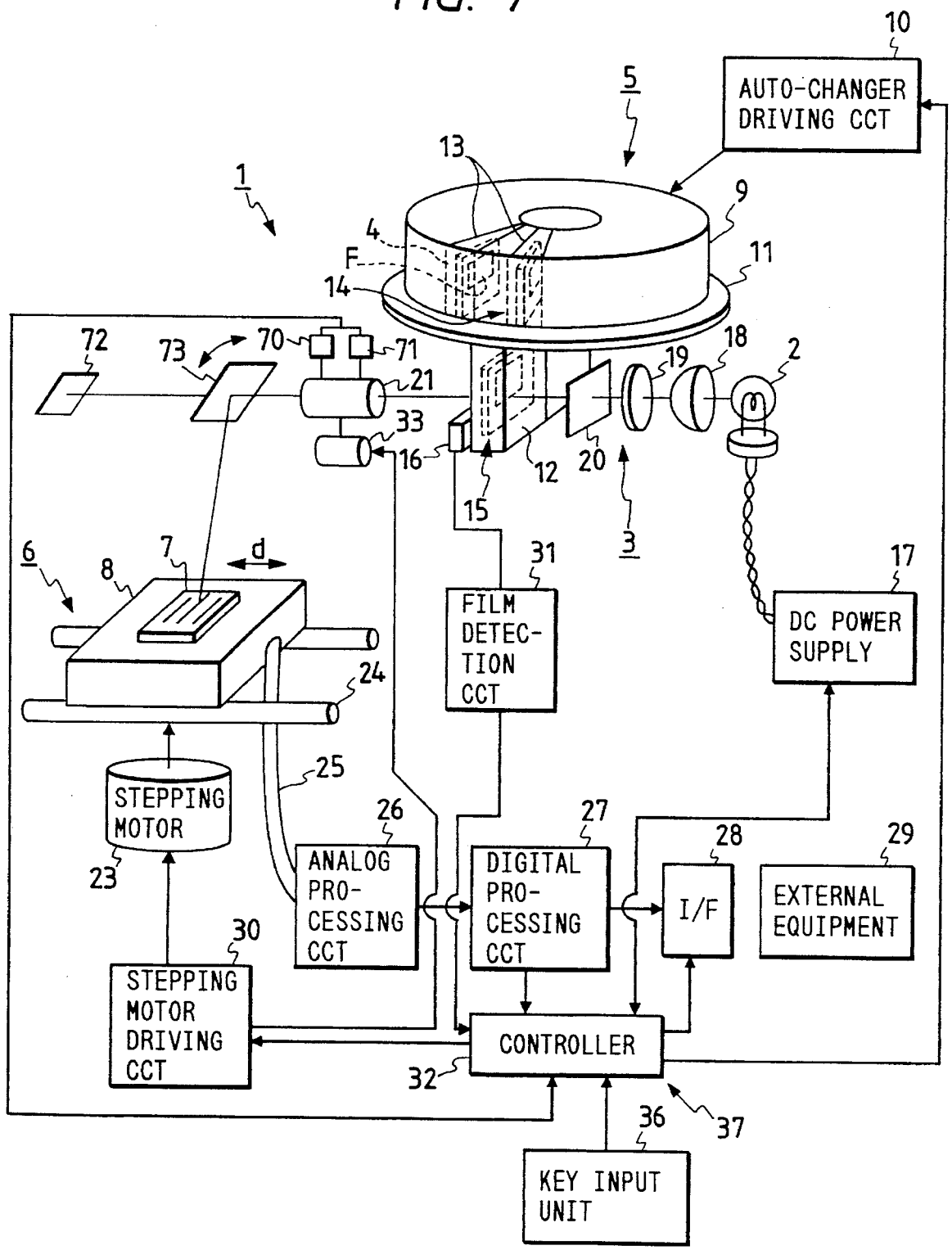
FIG. 7 shows a configuration of a third embodiment of the image reading apparatus.

FIG. 7 shows a schematic configuration of the image reading apparatus in accordance with a third embodiment of the present invention. In FIG. 7, the identical elements to those shown in the forth embodiment of FIG. 1 are designated by the identical numerals and the explanation thereof is omitted.

The image reading apparatus of the present embodiment comprises a screen 72 for forming an optical viewer as the display unit for displaying a projected image of the film F. When the optical path switching mirror 73 is positioned externally of the optical path, the light image of the film F is projected to the screen 72 through the projection lens 21.

When the transmitted light from the film F is reflected by the optical path switching mirror 73, the light image of the film F is projected to the 3-line sensor 7 and the image is read in the same manner as that in the first embodiment. The optical path switching mirror 73 is switched in direction to switch the optical path to direct the transmitted light of the film F to the screen 72 or the 3-line sensor 7.

Numeral 71 denotes a position sensor for detecting a home position of the projection lens 21, and numeral 70 denotes a magnification sensor for detecting the projection magnification of the projection lens 21. The stepping motor 33 is provided to drive the projection lens 21 to conduct the automatic focusing and it is driven by the stepping motor drive circuit 30.

In the illumination unit 3, a light emitted from the halogen lamp 2 connected to the DC power supply 17 is irradiated to the read unit 12 through the condenser lens 18, the field lens 19 and the optical filter 20. The film F at the read position 15 is irradiated by the light and a transmitted light therefrom is passes through the projection lens 21, is reflected by a reflection mirror 73 and irradiated to the 3-line sensor 7 so that the image is read by the 3-line sensor 7.

The 3-line sensor comprises three line sensors having red, green and blue on-chip optical filters arranged thereon as it does in the previous embodiments, and the main scanned is conducted by the respective line sensors and the sub-scan is conducted by driving the read unit 8 along the rail 24 normally (direction d in FIG. 7) to the main scan direction by the stepping motor 23.

The information read by the CCD 3-line sensor 7 is supplied to the analog processing circuit 26 in a form of analog signal through the cable 25, and it is DC-restored, amplified and A/D converted, and processed in the digital processing circuit 27, and sent to the external equipment 29 through the interface circuit 28.

The digital signal processing circuit 26 includes a variable magnification circuit for varying the magnification in the main scan direction for the input image signal. The magnification in the sub-scan direction is varied by changing the velocity of the read unit 8 in the sub-scan direction by the stepping motor 23.

In the prior art, when the image is read, the automatic focusing is conducted and the projection magnification is determined based on the projected image.

In the present embodiment, however, when the automatic focusing is conducted, the position of the in-focus projection lens is detected, and the home position of the projection lens 21 and the position of the projection lens 21 after the automatic focusing are compared, and the distance error is reflected to the projection magnification of the output image determined based on the projected image to correct the projection magnification.

FIGS. 8 and 9 show constructions for detecting the position of the projection lens 21 after the automatic focusing.

The stepping motor 33 is provided with an eccentric cam 81. As the eccentric cam 81 is rotated by the stepping motor 33, a lens barrel of the projection lens 21 is moved in the direction of an arrow. Thus, the focusing of the projection lens 21 is conducted.

In FIG. 8, the displacement of a mark 83 provided on the lens barrel of the projection lens 21 is measured by the position sensor 71 and the measurement is outputted to the controller 32 so that the controller 32 may recognize the displacement of the projection lens by the automatic focusing.

In FIG. 8, the point at which a flag 84 integral with the eccentric cam 34 is positioned in a photo-interrupter 85 is selected as a reference point of the projection lens 21, and the number of steps of the stepping motor from the reference position is counted so that the controller 32 recognizes the displacement of the projection lens 21.

In this manner, the displacement of the projection lens 21 from the reference position is recognized to determine the projection magnification of the projection lens 21 after the automatic focusing.

The controller 32 is provided with a magnification correction table which contains magnification correction data for the displacement of the projection lens 21, and the magnification correction data is outputted in accordance with the displacement of the projection lens 21 recognized in the manner described above.

The controller 32 sets the magnification in the main scan direction by the digital processing circuit 27 and the drive velocity of the stepping motor 33 based on the magnification correction data. Namely, the variation of the magnification due to the movement of the projection lens 21 by the automatic focusing is corrected by the electrical technique to conduct the film image reading at the proper magnification.

As a result, the same projection magnification as the preset projection magnification is attained even if the projection lens is moved from the home position by the automatic focusing.

Accordingly, the difference between the output range to be outputted and the actual output range of the image is eliminated.

In the third embodiment described above, the displacement of the projection lens by the automatic focusing is detected and the image magnificaiton correction is effected in accordance with the displacement.

The image magnification correction may be effected by recognizing the image size actually projected to the 3-line sensor. A configuration therefor is now explained.

Fourth Embodiment

In the previous embodiment, the film frames are fixed to the slide mounts. The film fixed to the slide mount is usually a positive film, and a negative film is not separated frame by frame but it is separated as a continuous film of 6 frames or 4 frames, for example. When the images of such negative film are to be read, a film mount 40 having a plurality of apertures as shown in FIG. 10 is used. The respective apertures of the film mount 40 correspond to the frames of the belt-like film.

Where the film is properly held by such film mount 40, the image G of each of the frames of the film is positioned at the center of the aperture. Since the size of the apertures and the size of the image of each frame are predetermined, distances La and Lb from the inner edges 40a and 40b of the aperture to the edges Ga and Gb of the image G are predetermined values Ca and Cb.

Accordingly, by measuring the distances La and Lb in the film image projected on the 3-line sensor, the projection magnification of the image by the projection lens 21 can be recognized.

Thus, when the document sheet F is to be read by the image reading apparatus, it is read from the inner edge 40$a$ of the film mount which is slightly inside of the document sheet F. The document sheet F is actually read and the distances La and Lb between the inner edges 40$a$ and 40$b$ of the film mount 40 and the edges Ga and Gb of the image G which sent out the image are detected. The detected distances La and Lb and the predetermined values Ca and Cb are compared to recognize the projection magnification by the movement of the projection lens by the automatic focusing.

The distances La and Lb are detected in the following manner. The readout outputs of the 3-line sensor at three points a, b and c shown in FIG. 11 are shown in FIGS. 12A to 12C, respectively.

At the point a, the light to the 3-line sensor is totally blocked by the film mount 40 so that the outputs of the 3-line sensor are all black level (see FIG. 12A).

At the point b, the light transmitted through the negative film is directed to the 3-line sensor so that the output is produced from the 3-line sensor in accordance with the inner portions 40$b$—40$b'$ of the inner edges of the film mount 40 (see FIG. 12B).

At the point c, the light transmitted through a base portion of the negative film and the image G is directed to the 3-line sensor so that an output for the base portion is produced in accordance with the area from the inner edges 40$b$ and 40$b'$ of the film mount 40 to the edges Gb and Gb' of the image G, and an output is produced in accordance with the image of an area from the edge Gb to the other edge Gb' of the image G (see FIG. 12C).

Accordingly, the distance Lb in FIG. 10 may be detected by the number of pixels corresponding to the output for the base portions 40$b$-Gb in the output at the point c. The distance La may be determined by counting the number of scans from the time of change of the output of the 3-line sensor from the state (a) to the state (b) in FIGS. 12A to 12C and stopping the count at the time when the output of the 3-line sensor changes from the state (b) to the state (c) to determine the number of scan lines corresponding to the distance La.

In this manner, the number of pixels for the distance Lb and the number of scans for the distance La are determined, and those numbers are compared with the reference number of pixels and the reference number of scans so that the controller 32 can recognize the projection magnification of the image to the 3-line sensor. The controller 32 electrically varies the magnification in accordance with the recognized projection magnification to conduct the magnification correction.

In accordance with the present embodiment, the position of the projection lens at the focusing is detected by the position detection means and the preset projection magnification of the projection lens is detected by the magnification detection means. Based on the detection results by the position detection means and the magnification detection means, the projection magnification of the projection lens is corrected.

Thus, the same projection magnification as the preset projection magnification is attained even if the projection lens is moved from the home position by the focusing.

Accordingly, the error between the output range desired to output and the output range of the actual output image is eliminated.

Where the distance detection means is provided, the distance between the inner edge of the mount member and the edge of the image of the document sheet held by the mount member is detected by the distance detection means. Based on the detected result by the distance detection means, the projection magnification of the projection lens is controlled by the magnification control means.

In the configurations of FIGS. 1, 2, 4 and 7, when the advance button or the retract button is continuously depressed, the auto-changer sequentially sets a plurality of films to the read position so that the images are sequentially displayed on the viewer. Thus, the operator may search a desired image from the films set in the auto-changer.

Figure 13:
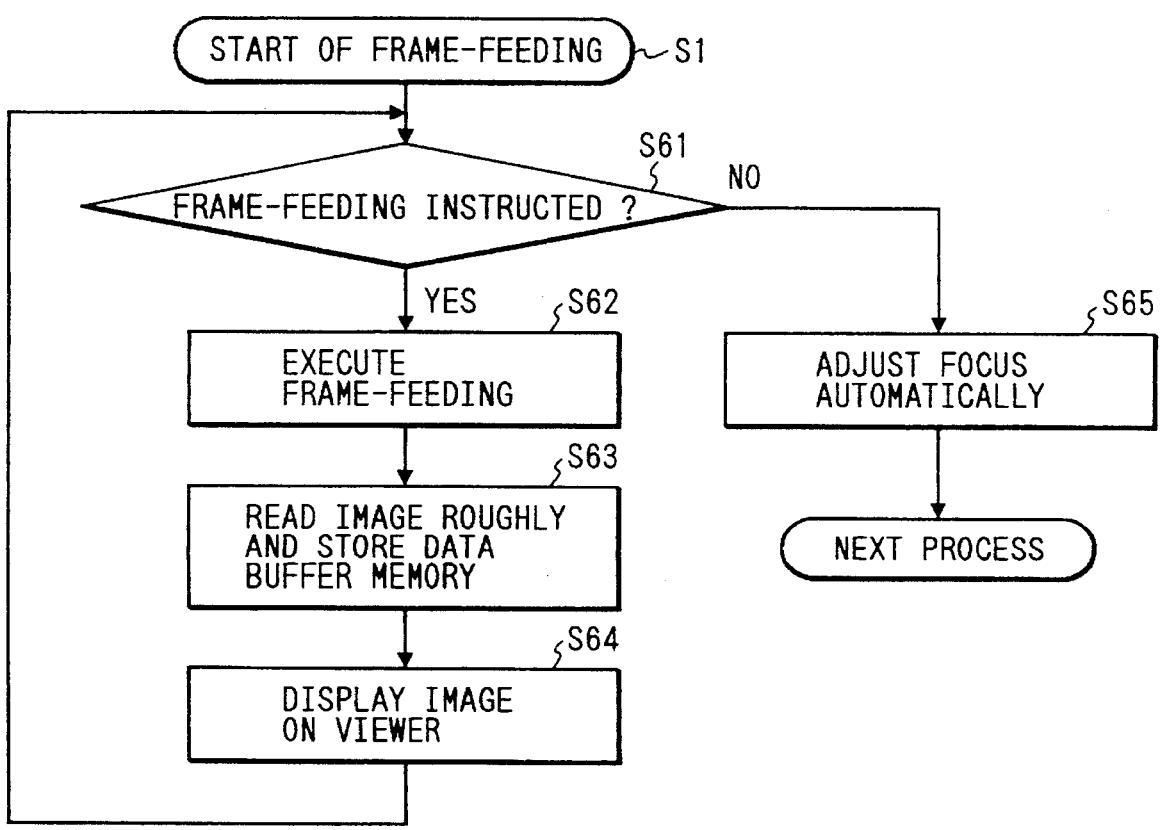
FIG. 13 shows a sequence of a frame feed operation.

FIG. 13 shows a process of the frame-feed operation in the configuration of FIG. 1.

When the operator instructs the frame feed (S61), the film is set in the read position by the auto-changer (S62), the image is coarsely read by the 3-line sensor 7 and it is stored in the buffer memory (S63), and the image is displayed on the viewer 35 in accordance with the data in the buffer memory (S64).

When the frame feed is still instructed, the next film is set to the read position by the auto-changer, it is read by the 3-line sensor and it is displayed on the viewer.

When the desired image is displayed on the viewer 35 through the above frame feed operation and the frame feed instruction by the operator is no longer issued, the process proceeds to a step S65 where the automatic focusing is conducted, and the next step is executed.

In this manner, the automatic focusing is not conducted during the frame feed operation for searching the desired one of the plurality of films, and the sequential display of the images of the films is conducted, and when the desired film is retrieved, the automatic focusing is conducted.

Accordingly, the monitoring of the images of the plurality of films by the frame feed operation can be continuously and rapidly conducted.

While preferred embodiments of the present invention have been shown and described, it should be understood that the present invention is not limited thereto and various modifications thereof may be made without departing from the scope of the claim.

What is claimed is:

1. An image reading apparatus comprising:

reading means for reading an image of a document by main scanning the image and generating an image signal;

moving means for moving a position of main scanning on the image for sub-scanning the image;

adjusting means for making a focus adjustment by adjusting a focus of an optical member for projecting the image onto said reading means;

first correcting means for performing a magnification changing process on the image signal in accordance with the focus adjustment by said adjusting means, so as to correct an image magnification in a main scanning direction;

second correcting means for varying a speed of sub-scanning in accordance with the focus adjustment by said adjusting means, so as to correct an image magnification in a sub-scanning direction; and detection means for detecting a displacement of the optical member caused by the focus adjustment by said adjusting means, wherein said first and second correcting means operate in accordance with the displacement of the optical member detected by said detection means.

2. An image reading apparatus according to claim 1, wherein said adjusting means adjusts the focus of the optical member in accordance with the image signal generated by said image pickup element.

3. An image reading apparatus according to claim 1, wherein said reading means comprises a line sensor for main scanning the image of the document.

4. An image reading apparatus according to claim 1, wherein the document is a film on which image information to be read is recorded.

5. An image reading method of reading an image of a document by an image pickup element onto which the image is projected through an optical member, comprising:

an adjusting step of adjusting a focus of the optical member;

a detecting step of detecting a displacement of the optical member caused by the focus adjustment in said adjusting step;

a first correcting step of performing a magnification changing process on an image signal from the image pickup element in accordance with the displacement of the optical member detected in said detecting step so as to correct an image magnification in a main-scanning direction; and a second correcting step of varying a speed of a movement of a position on the image to be read by the image pickup element in accordance with the displacement of the optical member detected in said detecting step so as to correct an image magnification in a sub-scanning direction.

* * * * *

UNITED STATES PATENT AND TRADEMARK OFFICE
CERTIFICATE OF CORRECTION

PATENT NO. : 5,568,273

DATED : October 22, 1996

INVENTORS : YUICHI SATO ET AL.

It is certified that error appears in the above-identified patent and that said Letters Patent is hereby corrected as shown below:

COLUMN 1

Line 61,   "an" should read --a--.

COLUMN 5

Line 5,    "massage" should read --message-- and "to" should read --for--;
   Line 21,   "massage" should read --message--.

COLUMN 7

Line 40,   "(step A53)," should read --(step S53),--;
   Line 67,   "affect" should read --effect--.

COLUMN 9

Line 2,    "forth" should read --first--;
   Line 30,   "is" should be deleted;
   Line 36,   "scanned" should read --scanning--.

UNITED STATES PATENT AND TRADEMARK OFFICE
CERTIFICATE OF CORRECTION

PATENT NO. : 5,568,273

DATED : October 22, 1996

INVENTORS : YUICHI SATO ET AL.

It is certified that error appears in the above-identified patent and that said Letters Patent is hereby corrected as shown below:

COLUMN 12

Line 44, "claim." should read --claims.--.

Signed and Sealed this

Twentieth Day of May, 1997

Attest:

BRUCE LEHMAN

*Attesting Officer*    *Commissioner of Patents and Trademarks*